(12) United States Patent
Tsutsui

(10) Patent No.: US 6,704,047 B1
(45) Date of Patent: Mar. 9, 2004

(54) DIGITAL STILL CAMERA AND CONTROL METHOD FOR ACCESSING IMAGE AND SPEECH DATA FILES

(75) Inventor: Satoru Tsutsui, Kanagawa (JP)

(73) Assignee: Ricoh Company, LTD, Tokyo (JP)

( * ) Notice: Subject to any disclaimer, the term of this patent is extended or adjusted under 35 U.S.C. 154(b) by 0 days.

(21) Appl. No.: 09/094,478

(22) Filed: Jun. 10, 1998

(30) Foreign Application Priority Data

Jun. 13, 1997 (JP) .............................. 9-157219

(51) Int. Cl.⁷ .................... H04N 5/76; H04N 5/222; H04N 11/00
(52) U.S. Cl. ................ 348/231.7; 348/231.2; 348/552; 348/333.05
(58) Field of Search ................. 348/231, 232, 348/233, 552, 231.99, 231.2, 231.3, 231.4, 231.6, 231.7, 333.02, 333.05, 333.11

(56) References Cited

U.S. PATENT DOCUMENTS

| | | | | |
|---|---|---|---|---|
| 5,226,145 A | * | 7/1993 | Moronaga et al. | 348/231 |
| 5,528,293 A | * | 6/1996 | Watanabe | 348/231 |
| 5,640,204 A | * | 6/1997 | Tsutsui | 348/231 |
| 5,699,549 A | * | 12/1997 | Cho | 348/233 |
| 5,706,457 A | * | 1/1998 | Dwyer et al. | 345/835 |
| 5,731,852 A | * | 3/1998 | Lee | 348/232 |
| 5,806,072 A | * | 9/1998 | Kuba et al. | 348/231 |
| 5,861,918 A | * | 1/1999 | Anderson et al. | 348/233 |
| RE36,338 E | * | 10/1999 | Fukuoka | 348/232 |
| 6,104,430 A | * | 8/2000 | Fukuoka | 348/232 |
| 6,192,191 B1 | * | 2/2001 | Suga et al. | 348/231 |
| 6,226,449 B1 | * | 5/2001 | Inoue et al. | 348/231 |
| 6,249,316 B1 | * | 6/2001 | Anderson | 348/333.05 |

FOREIGN PATENT DOCUMENTS

| | | |
|---|---|---|
| JP | 5-233771 | 9/1993 |
| JP | 6-78260 | 3/1994 |
| JP | 7-93097 | 4/1995 |
| JP | 7-225832 | 8/1995 |

* cited by examiner

*Primary Examiner*—Tuan Ho
*Assistant Examiner*—John M. Villecco
(74) *Attorney, Agent, or Firm*—Oblon, Spivak, McClelland, Maier & Neustadt, P.C.

(57) ABSTRACT

A digital still camera in which a CPU retrieves, when the digital still camera has been switched ON, whether any directory prepared by an external device (other maker's device: e.g., a digital still camera produced by some other maker or a PC) exists on a memory card or not, displays, when it is retrieved that the directory prepared by the external device exists thereon, a message or sign to that effect on an LCD, and reports it to an operator, in addition, the CPU has, as a reproduction mode, a mode for reproducing also a file in a directory prepared by an external device on the memory card.

34 Claims, 10 Drawing Sheets

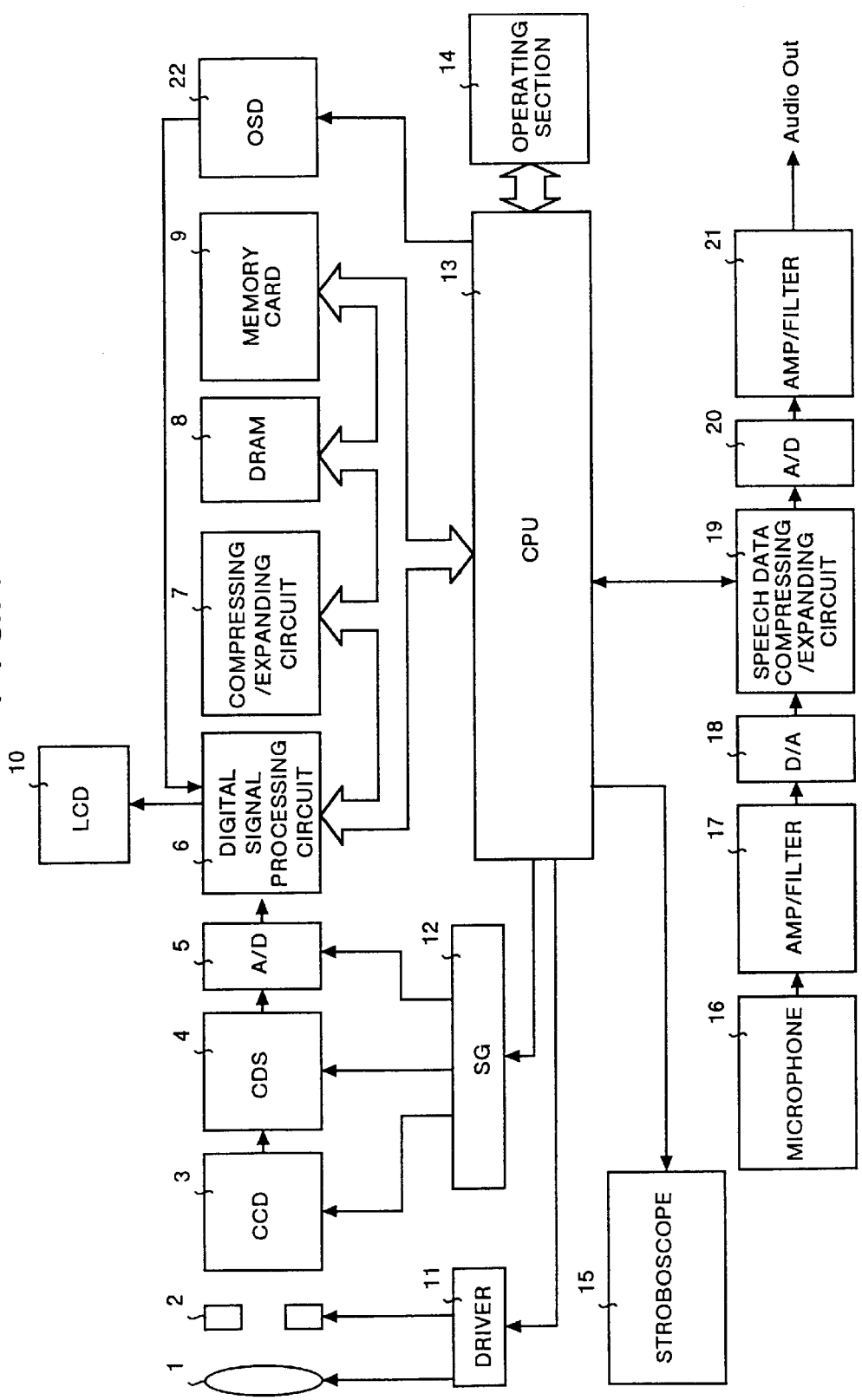

FIG.2

| ATTRIBUTE MEMORY 91 | COMMON MEMORY 92 | | | | REFERENCE |
|---|---|---|---|---|---|
| CARD ATTRIBUTE INFORMATION | ATTRIBUTE INFORMATION AREA 93 | | | | CARD MANAGEMENT |
| | DATA AREA 94 | MEMORY CONTROL AREA 95 | BOOT SECTOR AREA 96 | | DOS FILE MANAGEMANT |
| | | | FAT AREA 97 | | |
| | | | DIRECTRY ENTRY AREA 98 | | |
| | | DATA FILE AREA 99 | IMAGE DATA FILE 100 | HEADER | FILE ATTRIBUTE NAME OF DISCRETE SPECIFICATIONS VERSION OF SPECIFICATIONS RELATED INFORMATION FOR BODY OF IMAGE DATA |
| | | | | IMAGE DATA | E.G., JPEG DATA |
| | | | SPEECH DATA FILE 101 | HEADER | FILE ATTRIBUTE NAME OF DISCRETE SPECIFICATIONS VERSION OF SPECIFICATIONS RELATED INFORMATION FOR BODY OF SPEECH DATA |
| | | | | SPEECH DATA | E.G., ADPCM DATA |
| | | | RELATIONAL FILE 102 | HEADER | FILE ATTRIBUTE NAME OF DISCRETE SPECIFICATIONS VERSION OF SPECIFICATIONS |
| | | | | DATA | RELATED INFORMATION BETWEEN FILES |

THERE IS DIRECTORY BY OTHER MAKER'S DEVICE.

CASE OF DIRECTORY BY THE CAMERA

CASE OF DIRECTORY BY OTHER MAKER'S DEVICE

DIGITAL STILL CAMERA AND CONTROL METHOD FOR ACCESSING IMAGE AND SPEECH DATA FILES

FIELD OF THE INVENTION

The present invention relates to a digital still camera and control method thereof and more particularly, to a digital still camera and control method thereof enabling use of a storage medium shared with an external device.

BACKGROUND OF THE INVENTION

In recent years, a digital still camera using a memory card has been widespread. The memory cards each having the same specification are used for equipment with various types of built-in computer such as a personal computer (described as "PC" hereinafter), and the memory card is used for both the digital still camera and the PC.

As one of usage thereof, a sheet of memory card is shared for use with a digital still camera and a PC, an image is recorded by a digital still camera with a certain memory card, image data on that memory card is classified and cataloged, or synthesized on the PC, and the image is reproduced again by the digital still camera.

As described above, when a memory card is used for both a digital still camera and a PC, it is required that a format of the memory card is matched with DOS (Disk Operating System) of the PC. As standardized specifications of a memory card, various types of memory card have been proposed, and one of those standardized memory cards is used for a digital still camera.

When the memory card is used for the digital still camera, various ideas take place to efficiently manage prepared files.

For example, an image data reproducing device, disclosed in Japanese Patent Laid-Open Publication No. HEI 5-233771, enabling sharing of a storage medium with any device other than the image data reproducing device checks, at the time of reproducing an image, an attribute of a data file in a corresponding frame on a memory card specified by an control switch, and displays, when it is determined that the data file is a non-image data file, failure of reproduction on an LCD display section to avoid the inconvenience due to the failure of reproduction thereof.

However, the image data reproducing device disclosed in the Publication can not check, when data is stored in any place other than a directory which can be checked, attribute information for the data and can not determine whether the file can not be reproduced or is one which may be deleted.

When a storage medium (e.g., an ATA card) usable in an other maker's device (a digital still camera produced by some other maker) or a storage medium enabling easy preparation of a directory on a PC is employed for the own camera, there is sometimes a case where a directory prepared by an other maker's device or a directory prepared by a PC exists in the storage medium in addition to the directory prepared by the own camera. In this case, only files in the directory prepared by the own camera can generally be reproduced.

Namely, as only files in the directory prepared by the camera can be reproduced in the conventional technology, determination can not be made as to whether some other files are stored in the storage medium or not, and also determination can not be made as to whether any storage medium to be formatted may actually be formatted or not.

SUMMARY OF THE INVENTION

It is an object of the present invention to provide, for the purpose of solving the problems described above, a digital still camera and control method thereof making the determination described above easier at the time of formatting a storage medium by providing therein a mode for reproducing files in a directory of the storage medium prepared by a digital still camera some other maker or a PC or the like.

With an invention, a reproduction control unit has modes for reproducing an image data file in a directory prepared by the camera or by an external device in a storage medium, so that any image data file in the directory prepared by the external device in the storage medium can be reproduced, and an operator can learn what kind of image data files have been recorded in the storage medium. As a result, whether or not any storage medium to be formatted may actually be formatted can easily be determined.

With an invention, a retrieving unit retrieves, when a digital still camera has been switched ON, whether any directory prepared by the external device exists in a storage medium or not, and a reproduction control unit has modes for reproducing an image data file in a directory prepared by the camera or by an external device in the storage medium, so that retrieval is made as to whether any directory prepared by the external device exists in the storage medium or not, and any image data file in the directory prepared by the external device in the storage medium can be reproduced, and for this reason an operator can learn what kind of image data files have been recorded in the storage medium. As a result, whether or not any storage medium to be formatted may actually be formatted can easily be determined.

With an invention, a retrieving unit retrieves, when a digital still camera has been switched ON, whether any directory prepared by the external device exists in a storage medium or not, a reporting unit reports a result of retrieval by the retrieving unit, and a reproduction control unit has modes for reproducing an image data file in a directory prepared by the camera or by an external device in the storage medium, so that retrieval is made as to whether any directory prepared by the external device exists in the storage medium or not, a result of the retrieval can be reported to an operator, and any image data file or a speech data file in the directory prepared by the external device in the storage medium can be reproduced, and for this reason the operator can learn existence of the directory prepared by the external device as well as what kind of files have been recorded in the storage medium. As a result, whether or not any storage medium to be formatted may actually be formatted can easily be determined.

With an invention, a reproduction control unit has modes for reproducing an image data file or a speech data file in a directory prepared by the camera or by an external device in a storage medium, so that any image data file or a speech data file in the directory prepared by the external device in the storage medium can be reproduced, and for this reason an operator can learn what kind of image data files or speech data files have been recorded in the storage medium. As a result, whether or not any storage medium to be formatted may actually be formatted can easily be determined.

With an invention, a switching unit switches between a first mode and a second mode, so that an operator can easily switch between a mode for reproducing a file in a directory prepared by the camera in a storage medium and a mode for reproducing a file in a directory prepared by the camera or by an external device in the storage medium.

With an invention, an external device is a digital still camera produced by some other maker or a personal computer, so that any file in the directory in a storage medium prepared by the digital still camera produced by some other maker or by the personal computer can be reproduced.

With an invention, a storage medium is DOS-formatted, and a retrieving unit checks a DOS-controlled area on the storage medium and retrieves whether any directory prepared by an external device exists therein or not, so that existence of any directory prepared by the external device can easily be retrieved.

With an invention, a result of retrieval by a retrieving unit appears on a display section, so that an operator can visually check the result of the retrieval thereon.

Other objects and features of this invention will become understood from the following description with reference to the accompanying drawings.

BRIEF DESCRIPTION OF THE DRAWINGS

FIG. 1 is a block diagram showing one embodiment of a digital still camera according to the present invention;

FIG. 2 is a view showing one example of a format in a memory card;

DESCRIPTION OF THE PREFERRED EMBODIMENT

Figure 3:
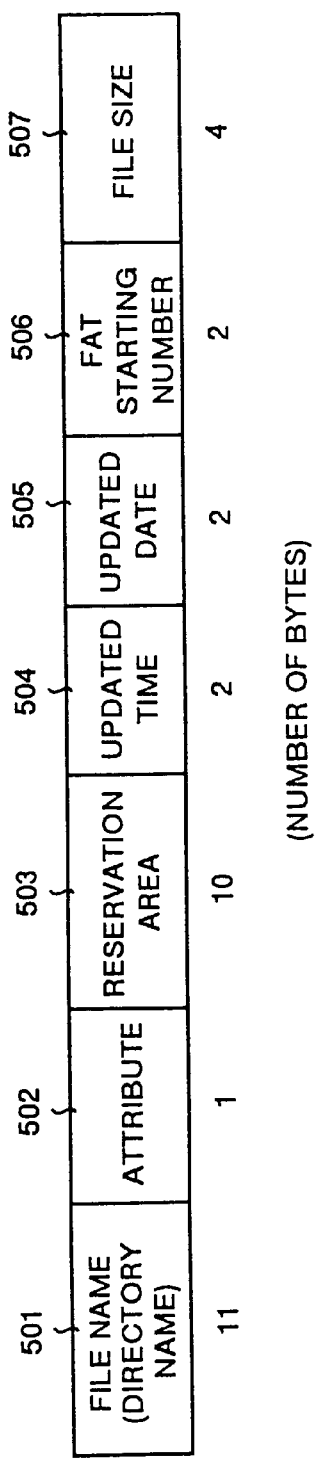
FIG. 3 is a view showing one example of a data structure stored in a directory entry area of the memory card.

Detailed description is made hereinafter for the preferred embodiment of the present invention with reference to the related drawings.

FIG. 1 is a block diagram showing one embodiment of a digital still camera according to the present invention.

The digital still camera shown in FIG. 1 comprises a lens 1, a mechanical device 2 including an autofocus, a CCD 3, a CDS circuit 4, an A/D converter 5, a digital signal processing circuit 6, a compressing/expanding circuit 7, a DRAM 8, a memory card 9, an LCD 10, a driver 11, an SG 12, a CPU 13, an operating section 14, a stroboscope 15, a microphone 16, an AMP/FILTER 17, a D/A converter 18, a speech data compressing/expanding circuit 19, an A/D converter 20, an AMP/FILTER 21, and an OSD 22.

A lens unit comprises the lens 1 and a mechanical function 2 including the auto focus (AF), a diaphragm and a filter section, and a mechanical shutter of the mechanical function 2 concurrently exposes two fields. The CCD (Charge-Coupled Device) 3 converts a video received through the lens unit to electric signals (analog image data). The CDS (Correlation Duplex Sampling) circuit 4 is a circuit for reducing noises for a CCD type of image pickup device. The A/D converter 5 converts analog image data received from the CCD 3 through the CDS circuit 4 to digital image data. Namely, an output signal from the CCD 3 is converted to a digital signal at an optimal sampling frequency (e.g., an integral multiple of a sub-carrier frequency of an NTSC signal) by the A/D converter 5 through the CDS circuit 4.

Also, the digital signal processing section 6 divides the image data received from the A/D converter 5 into data for color difference and data for brightness to be subjected to data processing for various processing, correction, and image compression/expansion.

The image compressing/expanding circuit 7 executes, for example, orthogonal transformation/inverted orthogonal transformation as one process during image compression/expansion following the JPEG as well as Huffman-encoding/Huffman-decoding as one process during the image compression/expansion following the JPEG.

On the other hand, speech is converted to electric signals by a speech-electric signal converting device such as the microphone 16 to obtain speech data, and the speech data is converted to digital speech data at a sampling frequency twice as high as a specified band by the D/A converter 18 after amplified by the AMP/FILTER 17 and cut off to be a required band. Further, this digital speech data is subjected to compression and encoding processing by the data compressing/expanding section 19.

The DRAM 8 temporarily stores therein compressed image data. Compressed image data is recorded on the memory card 9 as an image data file, and compressed speech data is recorded thereon as speech data file.

An image corresponding to image data recorded on the memory card 9 appears on the LCD 10. A state of setting in a digital still camera such as a set mode or error also appears on the LCD 10. The operating section 14 has buttons used for selecting functions, instructing to pick up data, and some other settings executed from the outside.

The CPU 13 provides controls over each section of the digital still camera according to a control program stored in a ROM not shown in the figure in response to an instruction from the operating section 14 or to an instruction through an operation from the outside such as a remote control not shown in the figure. For example, the CPU 13 provides controls for recording operations of image data or speech data onto the memory card 9, for reproducing operations of image data file or speech data file recorded on the memory card 9, and for retrieving operations of a directory shown in FIG. 7. Namely, the CPU 13 performs functions of a record control unit, reproduction control unit, a directory retrieving unit, and a reporting unit or the like.

Next description is made for recording operations of image data in the digital still camera. At first, an image of a picked-up object inputted through the lens 1 is converted to electric signals (analog image data) by the CCD 3, and the analog image data inputted in the A/D converter 5 is converted to digital image data through the CDS 4. The converted digital image data is subjected to digital signals by the digital signal processing circuit 6, and the processed digital image data is stored in the DRAM 8 through a CPU bus. The digital image data stored in the DRAM 8 is inputted in the compressing/expanding circuit 7 through the CPU bus, subjected to compression, and again stored in the DRAM 8. After the compression is ended, the CPU 13 records the compressed image data stored in the DRAM 8 on the memory card 9 through the CPU bus as an image data file in a specified format.

Next description is made for reproducing operations of the digital still camera. When an image data file to be reproduced on the memory card 9 is specified through an operation of the operating section 14, the compressed image data for the specified image data file is read out, and stored in the DRAM 8. The image data stored in this DRAM 8 is inputted into the compressing/expanding circuit 7 through the CPU bus, subjected to expansion, and again stored in the DRAM 8. The expanded image data stored in the DRAM 8 is inputted into the digital signal processing circuit 6 through the CPU bus, and is converted to video signals to be displayed on the LCD 10.

FIG. 2 is a view showing one example of a format in a memory card 9. This format is defined in the JEIDAIC Memory Card Guide Line Ver 4.1 (PCMCIA R 2.0). This format is the same as that of the DOS for a PC.

The memory card 9 has, as shown in FIG. 2, an attribute memory 91 and a common memory 92. Stored in the attribute memory 91 is card attribute information such as a type of device, an access speed, and storage capacity. The common memory 92 has an attribute information area 93, and this attribute information area 93 comprises a data area 94 which comprises a memory control area 95 and a data file area 99.

The memory control area 95 has DOS information stored therein and comprises a boot sector area 96, a FAT area 97, and a directory entry area 98.

Recorded in the boot sector area 96 are a parameter required when data is read/written from/in the memory card 9, namely the number of FATs (file allocation table) and the number of directory entries or the like.

Written in the FAT area 97 are FAT entries as information indicating how the data in each file is recorded therein. It should be noted that a position on a memory where data is recorded is indicated by a cluster number as a number of a unit for writing in data.

FIG. 3 is a view showing one example of a data structure stored in the directory entry area 98.

Recorded in the directory entry area 98 is, as shown in FIG. 3, information on a file name 501, a file attribute 502, a reservation area 503, a prepared/updated time 504, a prepared/updated date 505, a physical position (FAT starting number) of a corresponding file or of a subdirectory entry 506, and a size of the file 507, respectively.

Stored in the data file area 99 are an image data file 100, a speech data file 101, and a relational file 102. The image data file comprises a header (where a file attribute or the like is recorded) and image data (e.g., JPEG data), and the speech data file comprises a header (where a file attribute or the like is recorded) and speech data (e.g., ADPCM data). The relational file 102 is a file for storing therein an order of records as well as information for combinations, and comprises a header (where a file attribute or the like is recorded) and data (related information between files).

Figure 4:
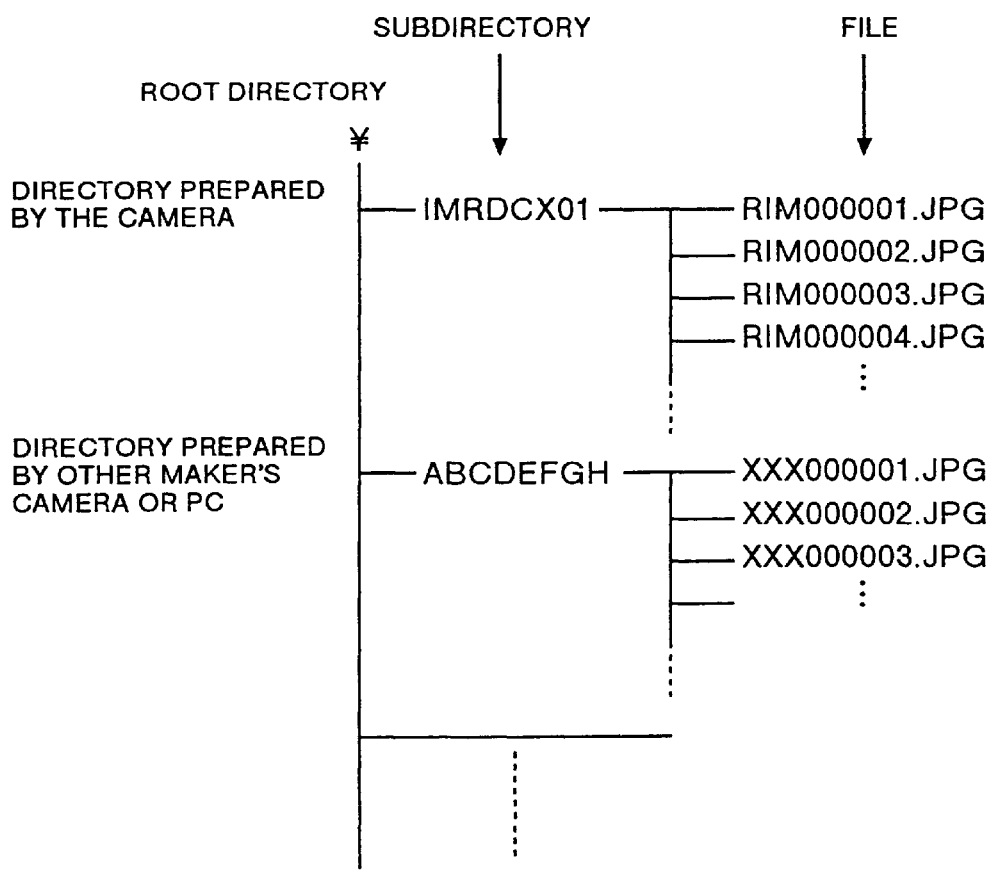
FIG. 4 is a view showing one example of a directory structure of the memory card.

FIG. 4 is a view showing one example of a directory structure of the memory card 9. This figure shows layers of the directory structure in the directory entry area 98.

As shown in FIG. 4, a subdirectory (IMRDCX01) prepared by the camera and a subdirectory (ABCDEFGH) prepared by an other maker's camera (a digital still camera produced by some other maker) or by a PC are formed therein. Prepared in the lower layer of the subdirectory (IMRDCX01) prepared by the camera are files of RIM000001.JPG, RIM000002.JPG, RIM000003.JPG, RIM000004.JPG, . . . . Also, prepared in the lower layer of the subdirectory (ABCDEFGH) prepared by an other maker's camera or a PC are files of XXX000001.JPG, XXX000002.JPG, XXX000003.JPG, XXX000004.JPG, . . .

Figure 5:
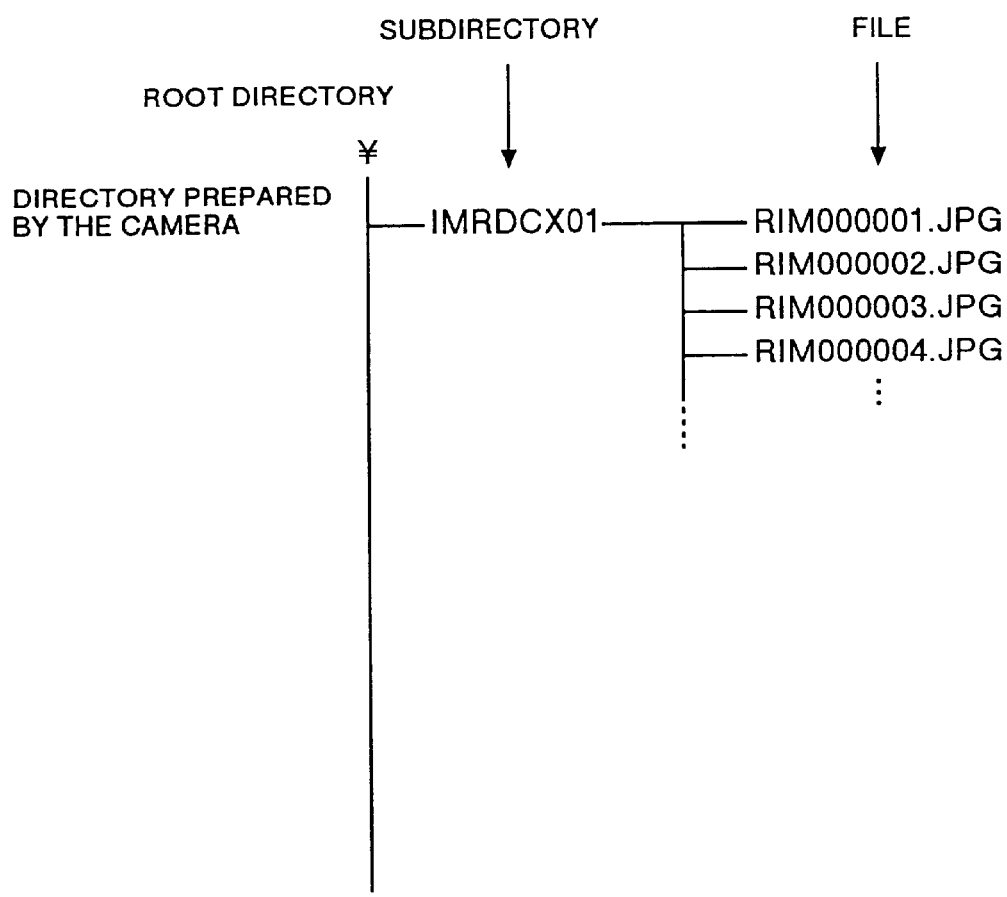
FIG. 5 is a view showing another example of the directory structure of the memory card.

FIG. 5 is a view showing another example of the directory structure of the memory card 9. This figure shows layers of the directory structure in the directory entry area 98.

As shown in FIG. 5, only a subdirectory (IMRDCX01) prepared by the camera is formed therein. Prepared in the lower layer of the subdirectory (IMRDCX01) prepared by the camera are files of RIM000001.JPG, RIM000002.JPG, RIM000003.JPG, RIM000004.JPG, . . . .

Figure 6:
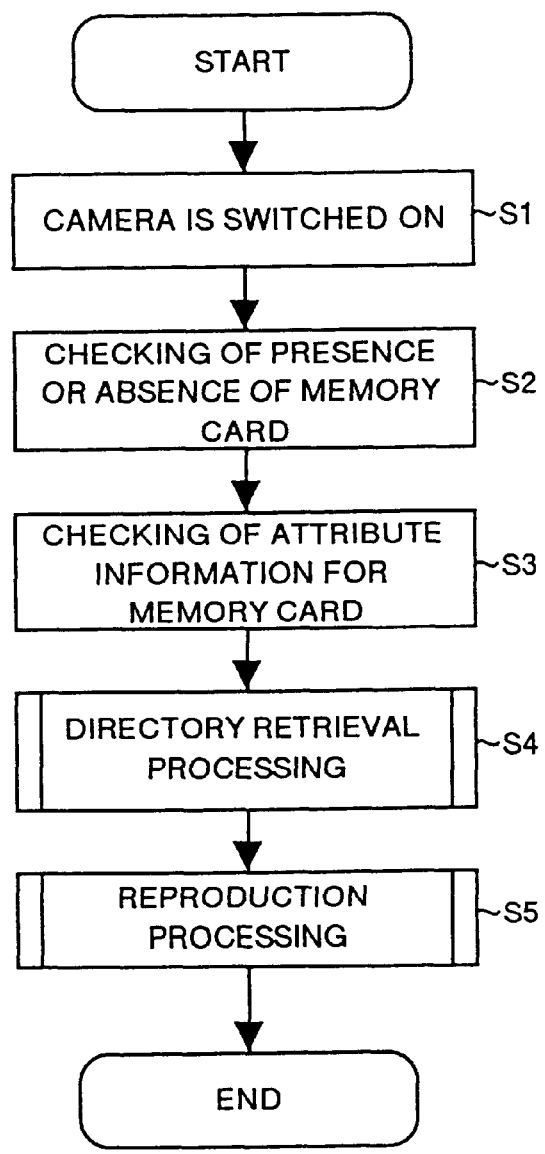
FIG. 6 is a flow chart showing an example of operations according to the present invention of the digital still camera.
Figure 7:
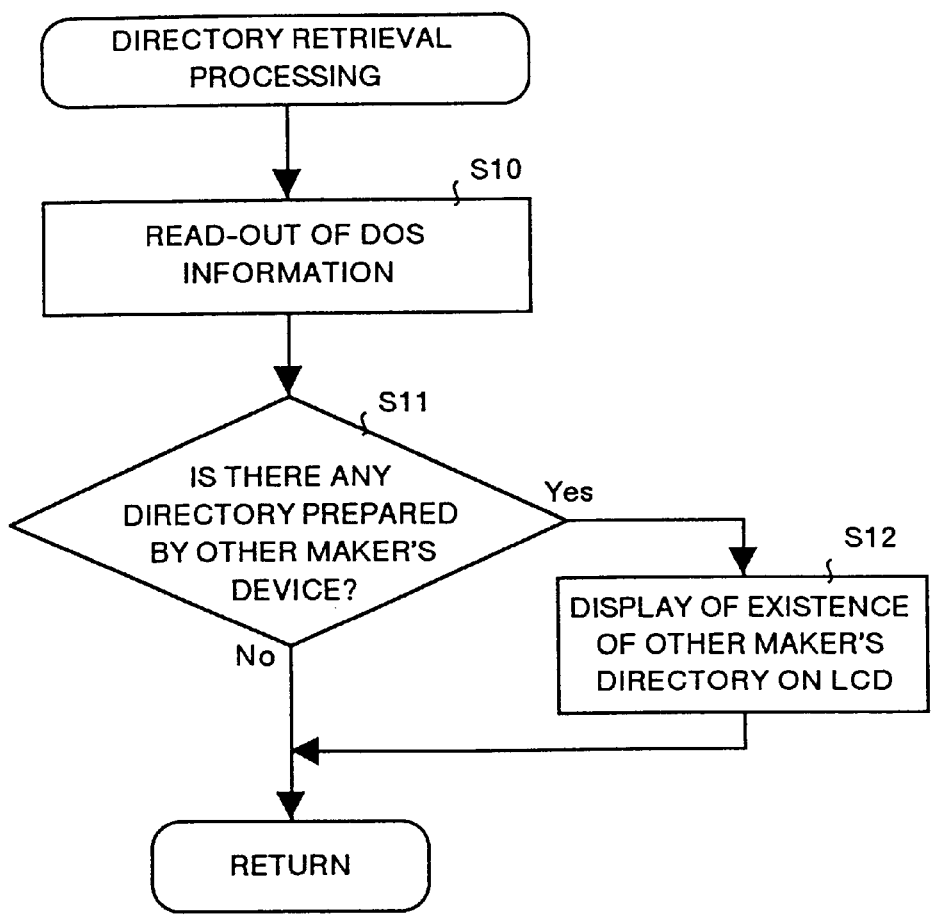
FIG. 7 is a flow chart showing directory retrieval processing.
Figure 8:
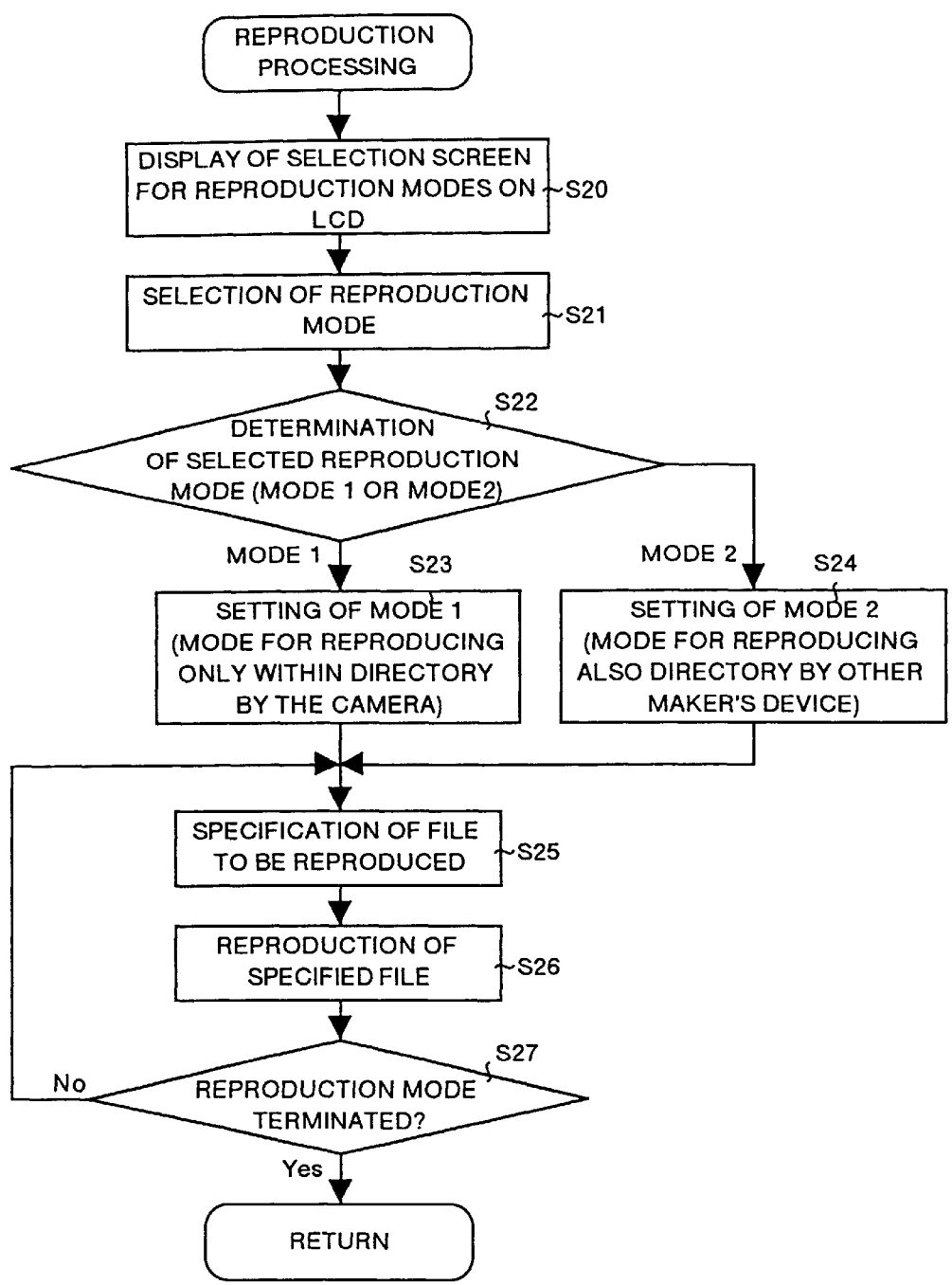
FIG. 8 is a flow chart showing reproduction processing.

Next description is made for an example of operations according to the present invention of the digital still camera having the configuration above with reference to the f low chart shown in FIG. 6 to FIG. 8.

FIG. 6 is a flow chart showing an example of operations according to the present invention of the digital still camera.

FIG. 7 is a flow chart showing directory retrieval processing.

FIG. 8 is a flow chart showing reproduction processing.

In FIG. 6, at first, when a power switch of the digital still camera is turned ON and power is supplied thereto (step S1, the CPU 13 determines in step S2 whether the memory card 9 has been inserted in the digital still camera or not. As a result, when it is determined that the memory card 9 has not been inserted in the digital still camera, the CPU 13 displays a message or sign to the effect that the memory card 9 has not been inserted therein on the LCD 10, and sends a report to that effect to an operator.

When it is determined that the memory card 9 has been inserted therein, the processing shifts to step S3, attribute information (card attribute information) stored in the attribute memory 90 of the memory card 9 is read out. As a result, when the card is usable, the CPU 13 executes directory retrieval processing in step S4.

Description is made for detailed contents of this directory retrieval processing with reference to the flow chart shown in FIG. 7. In this processing, "other maker's device" indicates an external device such as a digital still camera produced by some other maker or a personal computer.

Figures 9, 10:
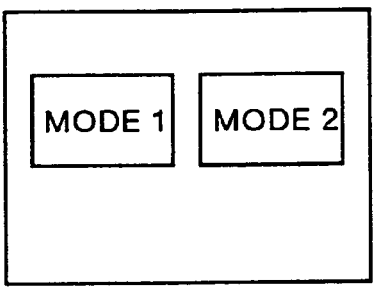
FIG. 9 is a view showing a display example of a result of directory retrieval.
FIG. 10 is a view showing a display example of a selection screen for a reproduction mode thereon.

At first, the CPU 13 reads out DOS information from the memory control area 95 on the common memory 92 of the memory card 9 (step S10). In this case, the CPU 13 also reads out the directory entry area 98, searches the directory entry area to determine whether any directory prepared by an other maker's device exists therein or not (step S11). As a result, when it is determined that the directory prepared by an other maker's device exists therein, the CPU 13 displays, as shown in FIG. 9, for example, a message or sign to the effect that the directory by the other maker's device exists therein on the LCD 10 (step S12) by using an OSD display or the like, sends a report to that effect that the other maker's directory exists therein to an operator, and terminates the directory retrieval processing. It should be noted that limitation to the display is not always required and a voice report may be made in order to send a report to the effect that an other maker's directory exists therein to the operator.

Reproduction processing is executed in step S5 in FIG. 6. Description is made for detailed contents of this reproduction processing with reference to the flow chart shown in FIG. 8.

It should be noted that the digital still camera (CPU 13) has, as reproduction modes, a mode 1 for reproducing only a file in a directory prepared by the camera and a mode 2 for reproducing also a file in a directory prepared by an other maker's device or the camera. A "file" described below indicates an image data file or a speech data file.

In FIG. 8, at first, the CPU 13 displays a selection screen for reproduction modes on the LCD 10 (step S20). Herein, when any directory prepared by an other maker's device exists, for example, a selection menu for the reproduction modes shown in FIG. 10 appears thereon. In FIG. 10, there appears the selection menu for instructing selection of either one of the mode 1 (mode for reproducing only a file in a directory prepared by the camera) and the mode 2 (mode for reproducing also a file in a directory prepared by an other maker's device).

Then, either one of the reproduction modes is selected through an inputting operation of the operating section 14 by the operator (step S21). The CPU 13 determines which of the mode 1 and mode 2 has been selected (step S22), and sets, when it is determined that the mode 1 has been selected, the mode 1 for reproducing only a file in a directory prepared by the camera as a reproduction mode (step S23). On the other hand, when it is determined that the mode 2 has been selected, the CPU 13 sets the mode 2 for reproducing also a file in a directory prepared by an other maker's device (step S24). Then, the CPU 13 reproduces, when any file to be reproduced on the memory card 9 is specified through the operation of the operating section 14 by the operator (step S25), the specified file on the memory card 9 (step S26). It should be noted that the CPU 13 displays, when the mode 1 has been set and if any file in an other maker's directory is specified, a message or sign to the effect that reproduction thereof can not be performed on the LCD 10. Although the digital still camera has configuration such that a reproduction mode is selected from the selection menu displayed on the LCD 10 for switching, the configuration may be made that switches for switching between the mode 1 and mode 2 are provided in the operating section 14 and a mode is switched by selecting one of those switches.

The CPU 13 ends, when termination of the reproduction mode is instructed through an inputting operation of the operating section 14 by the operator, the reproduction processing, while returns to step S25 when the termination of the reproduction mode is not instructed.

Figure 11:
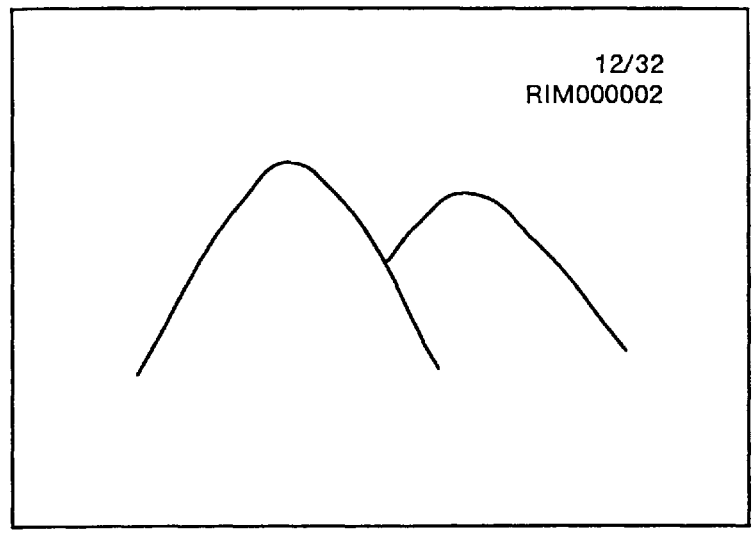
FIG. 11 is a view showing a display example of an image data file in a directory prepared by the camera.

FIG. 11 shows a display example of an image data file in a directory prepared by the camera, and image data appears on the LCD 10 and a file name "RIM000002" also appears in the right upper side of the screen as shown in FIG. 11.

Figure 12:
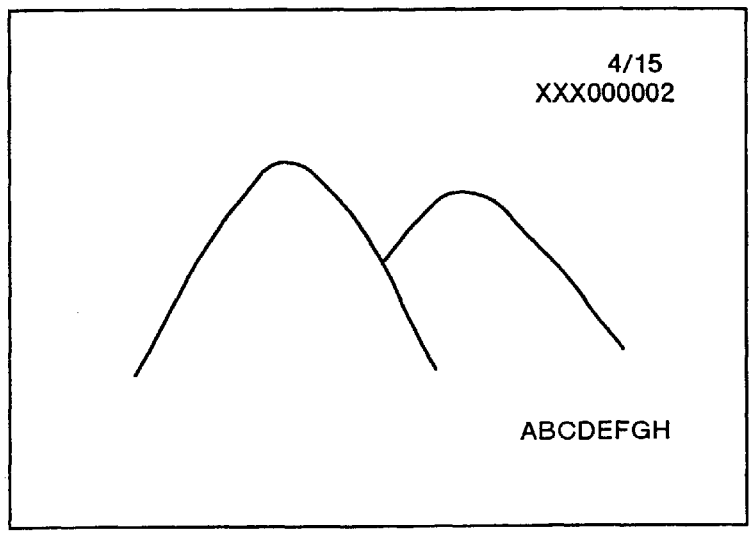
FIG. 12 is a view showing a display example of an image data file in a directory prepared by an other maker's device.

FIG. 12 shows a display example of an image data file in a directory prepared by an other maker's device, and image data appears on the display screen of the OSD 22, and a file name "XXX000002" in the right upper side of the screen as well as a directory name "ABCDEFGH" in the right lower side thereof also appears as shown in FIG. 12.

As described above, this embodiment has configuration such that the CPU 13 retrieves, when a digital still camera has been switched ON, whether any directory prepared by an external device (other maker's device: e.g., a digital still camera produced by some other maker or a PC) exists on a memory card 9 or not, displays, when it is retrieved that the directory prepared by the external device exists thereon, a message or sign to that effect on the LCD 10, and reports it to an operator, and in addition, the CPU 13 has, as a reproduction mode, also a mode for reproducing a file in a directory prepared by the camera or by an external device on the memory card 9.

Accordingly, retrieval is made as to whether any directory prepared by an external device exists on a memory card 9 or not, a result of the retrieval can be reported to an operator, and any file in any of the prepared directories on the memory card 9 can be reproduced, while the operator can learn existence of any directory prepared by an external device thereon and also what kind of files have been recorded thereon. As a result, whether or not the memory card 9 to be formatted may actually be formatted can easily be determined.

As described above, with the invention, a reproduction control unit has modes for reproducing an image data file in a directory prepared by the camera or by an external device in a storage medium, so that any image data file in the directory prepared by the external device in the storage medium can be reproduced, and an operator can learn what kind of image data files have been recorded in the storage medium. As a result, it is possible to provide a digital still camera which can easily determine whether any storage medium to be formatted may actually be formatted or not.

With the invention, a retrieving unit retrieves, when a digital still camera has been switched ON, whether any directory prepared by the external device exists in a storage medium or not, and a reproduction control unit has modes for reproducing an image data file in a directory prepared by the camera or by an external device in the storage medium, so that retrieval is made as to whether any directory prepared by the external device exists in the storage medium or not, and any image data file in the directory prepared by the external device in the storage medium can be reproduced, and for this reason an operator can learn what kind of image data files have been recorded in the storage medium. As a result, it is possible to provide a digital still camera which can easily determine whether any storage medium to be formatted may actually be formatted.

With the invention, a retrieving unit retrieves, when a digital still camera has been switched ON, whether any directory prepared by the external device exists in a storage medium or not, a reporting unit reports a result of retrieval by the retrieving unit, and a reproduction control unit has modes for reproducing an image data file in a directory prepared by the camera or by an external device in the storage medium, so that retrieval is made as to whether any directory prepared by the external device exists in the storage medium or not, a result of the retrieval can be reported to an operator, and any image data file in the directory prepared by the external device in the storage medium can be reproduced, and for this reason the operator can learn existence of the directory prepared by the external device as well as what kind of files have been recorded in the storage medium. As a result, it is possible to provide a digital still camera which can easily determine whether any storage medium to be formatted may actually be formatted.

With the invention, a reproduction control unit has modes for reproducing an image data file or a speech data file in a directory prepared by the camera or by an external device in a storage medium, so that any image data file or a speech data file in the directory prepared by the external device in the storage medium can be reproduced, and for this reason an operator can learn what kind of image data files or speech data files have been recorded in the storage medium. As a result, it is possible to provide a digital still camera which can easily determine whether any storage medium to be formatted may actually be formatted.

With the invention, a switching unit switches between a first mode and a second mode, so that it is possible to provide a digital still camera which an operator can easily switch between a mode for reproducing a file in a directory prepared by the camera in a storage medium and a mode for reproducing a file in a directory prepared by the camera or by an external device in the storage medium.

With the invention, an external device is a digital still camera produced by some other maker or a personal computer, so that it is possible to provide a digital still camera which any file in the directory in a storage medium prepared by the digital still camera produced by some other maker or by the personal computer can be reproduced.

With the invention, a storage medium is DOS-formatted, and a retrieving unit checks a DOS-controlled area on the storage medium and retrieves whether any directory prepared by an external device exists therein or not, so that it is possible to provide a digital still camera which existence of any directory prepared by the external device can easily be retrieved.

With the invention, a result of retrieval by a retrieving unit appears on a display section, so that it is possible to provide a digital still camera which an operator can visually check the result of the retrieval thereon.

This application is based on Japanese patent application No. HEI 9-157219 filed in the Japanese Patent Office on Jun. 13, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A digital still camera enabling use of a storage medium shared with an external device comprising:
    an image pickup means for picking up an image of an object to be picked up to obtain image data;
    a record control means for recording said image data in said storage medium as an image data file in a specified format; and
    a reproduction control means for controlling a reproducing operation of an image data file recorded in said storage medium,
    wherein said reproduction control means permits selection of either a first or second mode when the storage medium includes an image data file of the external device, the first mode for (i) reproducing an image data file in a directory prepared by the camera in said storage medium and (ii) permitting selection of but prohibiting reproduction of the image data file of the external device in the storage medium, and the second mode for (i) reproducing the image data file in the directory prepared by said camera and (ii) reproducing the image data file of said external device.

2. A digital still camera according to claim 1 further comprising a switching means for switching between said first mode and second mode.

3. A digital still cameral according to claim 1; wherein said external device is a digital still camera produced by some other maker or a personal computer.

4. A digital still camera enabling use of a storage medium shared with an external device comprising:
    an image pickup means for picking up an image of an object to be picked up to obtain image data;
    a record control means for recording said image data in said storage medium as an image data file in a specified format;
    a reproduction control means for controlling a reproducing operation of an image data file recorded in said storage medium; and
    a retrieving means for retrieving, when said digital still camera has been switched ON, whether any directory prepared by said external device exists in said storage medium or not,
    wherein said reproduction control means permits selection of either a first or second mode when the storage medium includes an image data file of the external device, the first mode for (i) reproducing an image data file in a directory prepared by the camera in said storage medium and (ii) permitting selection of but prohibiting reproduction of the image data file of the external device in the storage medium, and the second mode for (i) reproducing the image data file in the directory prepared by said camera and (ii) reproducing the image data file of said external device.

5. A digital still camera according to claim 4 further comprising a switching means for switching between said first mode and said second mode.

6. A digital still camera according to claim 4; wherein said external device is a digital still camera produced by some other maker or a personal computer.

7. A digital still camera according to claim 4; wherein said storage medium is DOS-formatted, and said retrieving means checks a DOS-controlled area on said storage medium and retrieves whether any directory prepared by said external device exists therein or not.

8. A digital still camera enabling use of a storage medium shared with an external device comprising:
    an image pickup means for picking up an image of an object to be picked up to obtain image data;
    a record control means for recording said image data in said storage medium as an image data file in a specified format;
    a reproduction control means for controlling a reproducing operation of an image data file recorded in said storage medium;
    a retrieving means for retrieving, when said digital still camera has been switched ON, whether any directory prepared by said external device exists in said storage medium or not; and
    a reporting means for reporting a result of retrieval by said retrieving means,
    wherein said reproduction control means permits selection of either a first or second mode when the storage medium includes an image data file of the external device, the first mode for (i) reproducing an image data file in a directory prepared by the camera in said storage medium and (ii) permitting selection of but prohibiting reproduction of the image data file of the external device in the storage medium, and the second mode for (i) reproducing the image data file in the directory prepared by said camera and (ii) reproducing the image data file of said external device.

9. A digital still camera according to claim 8 further comprising a switching means for switching between said first mode and said second mode.

10. A digital still camera according to claim 8; wherein said external device is a digital still camera produced by some other maker or a personal computer.

11. A digital still camera according to claim 8; wherein said storage medium is DOS-formatted, and said retrieving means checks a DOS-controlled area on said storage medium and retrieves whether any directory prepared by said external device exists therein or not.

12. A digital still camera according to claim 8; wherein said reporting means displays a result of retrieval by said retrieving means on a display section.

13. A digital still camera enabling use of a storage medium shared with an external device comprising:

an image pickup means for picking up an image of an object to be picked up to obtain image data;

a speech inputting means for converting speech to electric signals to obtain speech data;

a record control means for recording said image data as an image data file in a specified format and said speech data as a speech data file in a specified format each in said medium; and a reproduction control means for controlling a reproducing operation of an image data file or a speech data file recorded in said storage medium, wherein said reproduction control means permits selection of either a first or second mode when the storage medium includes at least one of an image data file and a speech data file of the external device, the first mode for (i) reproducing at least one of an image data file and a speech data file in a directory prepared by the camera in said storage medium and (ii) permitting selection of but prohibiting reproduction of the image data file and the speech data file of the external device in the storage medium, and the second mode for (i) reproducing at least one of the image data file and the speech data file in the directory prepared by said camera and (ii) reproducing at least one of the image data file and the speech data file of said external device.

14. A digital still camera according to claim 13 further comprising a switching means for switching between said first mode and said second mode.

15. A digital still camera according to claim 13; wherein said external device is a digital still camera produced by some other maker or a personal computer.

16. A digital still camera1 enabling use of a storage medium shared with an external device comprising:

an image pickup unit which picks up an image of an object to be picked up to obtain image data;

a record control unit which records said image data in said storage medium as an image data file in a specified format; and a reproduction control unit which controls a reproducing operation of an image data file recorded in said storage medium, wherein said reproduction control unit permits selection of either a first or second mode when the storage medium includes an image data file of the external device, the first mode for (i) reproducing an image data file in a directory prepared by the camera in said storage medium and (ii) permitting selection of but prohibiting reproduction of the image data file of the external device in the storage medium, and the second mode for (i) reproducing the image data file in the directory prepared by said camera and (ii) reproducing the image data file of said external device.

17. A digital still camera according to claim 16 further comprising a switching unit which switches between said first mode and said second mode.

18. A digital still camera according to claim 16; wherein said external device is a digital still camera produced by some other maker or a personal computer.

19. A digital still camera enabling use of a storage medium shared with an external device comprising:

an image pickup unit which picks up an image of an object to be picked up to obtain image data;

a record control unit which records said image data in said storage medium as an image data file in a specified format; a reproduction control unit which controls a reproducing operation of an image data file recorded in said storage medium; and a retrieving unit which retrieves, when said digital still camera has been switched ON, whether any directory prepared by said external device exists in said storage medium or not, wherein said reproduction control unit permits selection of either a first or second mode when the storage medium includes an image data file of the external device, the first mode for (i) reproducing an image data file in a directory prepared by the camera in said storage medium and (ii) permitting selection of but prohibiting reproduction of the image data file of the external device in the storage medium, and the second mode for (i) reproducing the image data file in the directory prepared by said camera and (ii) reproducing the image data file of said external device.

20. A digital still camera according to claim 19 further comprising a switching unit which switches between said first mode and said second mode.

21. A digital still camera according to claim 19; wherein said external device is a digital still camera produced by some other maker or a personal computer.

22. A digital still camera according to claim 19; wherein said storage medium is DOS-formatted, and said retrieving unit checks a DOS-controlled area on said storage medium and retrieves whether any directory prepared by said external device exists therein or not.

23. A digital still camera enabling use of a storage medium shared with an external device comprising:

an image pickup unit which picks up an image of an object to be picked up to obtain image data;

a record control unit which records said image data in said storage medium as an image data file in a specified format;

a reproduction unit which retrieves, when said digital still camera has been switched ON, whether any directory prepared by said external device exists in said storage medium or not; and a reporting unit which reports a result of retrieval by said retrieving unit, wherein said reproduction control unit permits selection of either a first or second mode when the storage medium includes an image data file of the external device, the first mode for (i) reproducing an image data file in a directory prepared by the camera in said storage medium and (ii) permitting selection of but prohibiting reproduction of the image data file of the external device in the storage medium, and the second mode for (i) reproducing the image data file in the directory prepared by said camera and (ii) reproducing the image data file of said external device.

24. A digital still camera according to claim 23 further comprising a switching unit which switches between said first mode and said second mode.

25. A digital still camera according to claim 23; wherein said external device is a digital still camera produced by some other maker or a personal computer.

26. A digital still camera according to claim 23; wherein said storage medium is DOS-formatted, and said retrieving unit checks a DOS-controlled area on said storage medium and retrieves whether any directory prepared by said external device exists therein or not.

27. A digital still camera according to claim 23; wherein said reporting unit displays a result of retrieval by said retrieving unit on a display section.

28. A digital still camera enabling use of a storage medium shared with an external device comprising:
   an image pickup unit which picks up an image of an object to be picked up to obtain image data;
   a speech input unit which converts speech to electric signals to obtain speech data;
   a record control unit which records said image data as an image data file in a specified format and said speech data as a speech data file in a specified format each in said storage medium; and
   a reproduction control unit which controls a reproducing operation of an image data file or a speech data file recorded in said storage medium,
   wherein said reproduction control unit permits selection of either a first or second mode when the storage medium includes at least one of an image data file and a speech data file of the external device, the first mode for (i) reproducing at least one of an image data file and a speech data file in a directory prepared by the camera in said storage medium and (i) permitting selection of but prohibiting reproduction of the image data file and the speech data file of the external device in the storage medium, and the second mode for (i) reproducing at least one of the image data file and the speech data file in the directory prepared by said camera and (ii) reproducing at least one of the image data file and the speech data file of said external device.

29. A digital still camera according to claim 28 further comprising a switching unit which switches between said first mode and said second mode.

30. A digital still camera according to claim 28; wherein said external device is a digital still camera produced by some other maker or a personal computer.

31. A control method of digital still camera enabling use of a storage medium shared with an external device comprising the steps of:
   picking up an image of an object to be picked up to obtain image data;
   recording said image data in said storage medium as an image data file in a specified format; and
   controlling a reproducing operation of an image data file recorded in said storage medium,
   wherein said controlling step permits selection of either a first or second mode when the storage medium includes an image data file of the external device, the first mode for (i) reproducing an image data file in a directory prepared by the camera in said storage medium and (ii) permitting selection of but prohibiting reproduction of the image data file of the external device in the storage medium, and the second mode for (i) reproducing the image data file in the directory prepared by said camera and (ii) reproducing the image data file of said external device.

32. A control method of digital still camera enabling use of a storage medium shared with an external device comprising the steps of:
   picking up an image of an object to be picked up to obtain image data;
   recording said image data in said storage medium as an image data file in a specified format;
   controlling a reproducing operation of an image data file recorded in said storage medium; and
   retrieving, when said digital still camera has been switched ON, whether any directory prepared by said external device exists in said storage medium or not,
   wherein said controlling step permits selection of either a first or second mode when the storage medium includes an image data file of the external device, the first mode for (i) reproducing only an image data file in a directory prepared by the camera in said storage medium and (ii) permitting selection of but prohibiting reproduction of the image data file of the external device in the storage medium, and the second mode for (i) reproducing the image data file in the directory prepared by said camera and (ii) reproducing the image data file of said external device.

33. A control method of digital still camera enabling use of a storage medium shared with an external device comprising the steps of:
   picking up an image of an object to be picked up to obtain image data;
   recording said image data in said storage medium as an image data file in a specified format;
   controlling a reproducing operation of an image data file recorded in said storage medium;
   retrieving, when said digital still camera has been switched ON, whether any directory prepared by said external device exists in said storage medium or not; and
   reporting a result of retrieval by said retrieving step,
   wherein said controlling step permits selection of either a first or second mode when the storage medium includes an image data file of the external device, the first mode for (i) reproducing an image data file in a directory prepared by the camera in said storage medium and (ii) permitting selection of but prohibiting reproduction of the image data file of the external device in the storage medium, and the second mode for (i) reproducing the image data file in the directory prepared by said camera and (ii) reproducing the image data file of said external device.

34. A control method of digital still camera enabling use of a storage medium shared with an external device comprising the steps of:
   picking up an image of an object to be picked up to obtain image data;
   converting speech to electric signals to obtain speech data;
   recording said image data as an image data file in a specified format and said speech data as a speech data file in a specified format each in said storage medium; and
   controlling a reproducing operation of an image data file or a speech data file recorded in said storage medium,
   wherein said controlling step permits selection of either a first or second mode when the storage medium includes at least one of an image data file and a speech date file of the external device, the first mode for (i) reproducing at least one of an image data file and a speech data file in a directory prepared by the camera in said storage medium and (ii) permitting selection of but prohibiting reproduction of the image data file and the speech data file of the external device in the storage medium, and the second mode for (i) reproducing at least one of the image data file and the speech data file in the directory prepared by said camera and (ii) reproducing at least one of the image data file and the speech data file of said external device.

* * * * *